United States Patent
Xue

(10) Patent No.: US 9,237,032 B2
(45) Date of Patent: Jan. 12, 2016

(54) METHOD, SYSTEM, AND DEVICE FOR FORWARDING DATA FRAMES

(75) Inventor: Li Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 522 days.

(21) Appl. No.: 13/337,577

(22) Filed: Dec. 27, 2011

(65) Prior Publication Data

US 2012/0099426 A1 Apr. 26, 2012

Related U.S. Application Data

(63) Continuation of application No. 12/778,191, filed on May 12, 2010, which is a continuation of application No. PCT/CN2008/072154, filed on Aug. 26, 2008.

(30) Foreign Application Priority Data

Nov. 13, 2007 (CN) .......................... 2007 1 0169426
Nov. 23, 2007 (CN) .......................... 2007 1 0194555

(51) Int. Cl.
*H04L 12/46* (2006.01)
*H04L 29/12* (2006.01)
(Continued)

(52) U.S. Cl.
CPC ........ *H04L 12/4604* (2013.01); *H04L 12/4633* (2013.01); *H04L 29/12839* (2013.01);
(Continued)

(58) Field of Classification Search
CPC ............ H04L 12/4604; H04L 12/4633; H04L 2212/00; H04L 29/12839; H04L 45/22; H04L 45/28; H04L 61/6022; H04L 69/22; H04L 69/40

USPC .......................................................... 370/228
See application file for complete search history.

(56) References Cited

U.S. PATENT DOCUMENTS 6,934,248 B1   8/2005   Deboer et al.
7,209,975 B1   4/2007   Zang et al.
(Continued)

FOREIGN PATENT DOCUMENTS

CN      1459160 A    11/2003
CN    101051995 A    10/2007
(Continued)

OTHER PUBLICATIONS

Torode "Bell South Introduces MPLS Backbone" May 13, 2003.*
(Continued)

*Primary Examiner* — Huy D Vu
*Assistant Examiner* — Stephen J Clawson
(74) *Attorney, Agent, or Firm* — Leydig, Voit & Mayer, Ltd.

(57) ABSTRACT

The present disclosure discloses a method, system, and device for forwarding data frames, and relates to the communication field. The method includes: An upstream near-end device in a faulty part of a working tunnel activates a segmental protection tunnel after receiving a data frame when a part of the working tunnel fails, where the start node of the segmental protection tunnel is the upstream near-end device and the end node of the segmental protection tunnel is a downstream near-end device in the faulty part; the upstream near-end device forwards the data frame to the downstream near-end device through the segmental protection tunnel; and the data frame at the downstream near-end device is forwarded to the destination device through the faultless part of the working tunnel. The present disclosure provides segmental protection for the PBB TE tunnel.

10 Claims, 14 Drawing Sheets

(51) Int. Cl.
- *H04L 12/707* (2013.01)
- *H04L 12/703* (2013.01)
- *H04L 29/14* (2006.01)
- *H04L 29/06* (2006.01)

(52) U.S. Cl.
CPC ............ *H04L45/22* (2013.01); *H04L 45/28* (2013.01); *H04L 61/6022* (2013.01); *H04L 69/40* (2013.01); *H04L 69/22* (2013.01); *H04L 2212/00* (2013.01)

(56) References Cited

U.S. PATENT DOCUMENTS

| | | | |
|---|---|---|---|
| 2002/0018449 A1* | 2/2002 | Ricciulli | 370/268 |
| 2002/0089712 A1 | 7/2002 | Kang et al. | |
| 2002/0093711 A1* | 7/2002 | Simmons et al. | 359/125 |
| 2003/0108029 A1* | 6/2003 | Behzadi | 370/351 |
| 2003/0177221 A1* | 9/2003 | Ould-Brahim et al. | 709/223 |
| 2004/0109687 A1* | 6/2004 | Park et al. | 398/57 |
| 2004/0190444 A1 | 9/2004 | Trudel et al. | |
| 2005/0281192 A1* | 12/2005 | Nadeau et al. | 370/217 |
| 2006/0126496 A1* | 6/2006 | Filsfils et al. | 370/216 |
| 2007/0076719 A1* | 4/2007 | Allan et al. | 370/392 |
| 2008/0219153 A1* | 9/2008 | Shand et al. | 370/225 |
| 2008/0310437 A1* | 12/2008 | Cheng et al. | 370/404 |
| 2009/0109843 A1 | 4/2009 | Yang | |

FOREIGN PATENT DOCUMENTS

| | | |
|---|---|---|
| CN | 101436976 B | 2/2012 |
| WO | WO 2009/062420 A1 | 5/2009 |

OTHER PUBLICATIONS

Written Opinion of the International Searching Authority (translation) dated (mailed) Dec. 11, 2008, issued in related Application No. PCT/CN2008/072154, filed Aug. 26, 2008, Huawei Technologies Co., Ltd.

First Chinese Office Action dated (mailed) Dec. 21, 2010, issued in related Chinese Application No. 200710194555.4 Huawei Technologies C., Ltd.

Second Chinese Office Action dated (mailed) Sep. 15, 2011, issued in related Chinese Application No. 200710194555.4 Huawei Technologies C., Ltd.

International Search Report for International Application No. PCT/CN2008/072154, mailed Dec. 11, 2008 Huawei Technologies C., Ltd.

First Office Action filed May 12, 2010; issued in related U.S. Appl. No. 12/778,191; dated May 24, 2012; Huawei Technologies Co., Ltd.

\* cited by examiner

US 9,237,032 B2

METHOD, SYSTEM, AND DEVICE FOR FORWARDING DATA FRAMES

CROSS-REFERENCE TO RELATED APPLICATIONS

This application is a continuation of U.S. Ser. No. 12/778,191, filed on May 12, 2010, which is a continuation of International Application No. PCT/CN2008/072154, filed on Aug. 26, 2008. The International Application claims priority to Chinese Patent Application No. 200710169426.X, filed on Nov. 13, 2007 and Chinese Patent Application No. 200710194555.4, filed on Nov. 23, 2007, all of which are hereby incorporated by reference in their entireties.

FIELD OF THE DISCLOSURE

The present disclosure relates to the communication field, and in particular, to a method, system, and device for forwarding data frames.

BACKGROUND

As a bearer network technology for the Next Generation Network (NGN), the Ethernet technology is characterized by low cost, easy operation, and convenient upgrade. The Ethernet technology develops from single networks to a hierarchical and connection-oriented trend, and the current hierarchical Ethernet technology shapes up gradually. In the development process, a Provider Backbone Bridge Traffic Engineering (PBB TE) technology, namely, a Provider Backbone Transport (PBT) technology, is generated.

The PBB TE technology implements the connection-oriented feature of the Ethernet, and is a derivative technology of the Ethernet standard. It disables the spanning tree and disables the flood mechanism and the broadcast mechanism of traditional Ethernet, and provides various services by setting up tunnels on the backbone network. The PBB TE technology is developed on the basis of the Media Access Control (MAC)-in-MAC technology. The MAC-in-MAC technology uses the MAC address of an operator to encapsulate a user's MAC address, thus reducing and isolating user MAC addresses in the data transmission process. The MAC-in-MAC technology enables a network to be hierarchical, for example, divides a network into three layers, namely, a user network layer, a provider network layer, and a backbone network layer connected to each provider network. FIG. 1 schematically shows MAC-in-MAC network connections in the prior art. The network connections include a user network layer, a provider network layer, and a backbone network layer. Specifically, the user network layer is composed of a Customer Bridged Network (CBN) X and a CBN Y; the backbone network layer is a Provider Backbone Bridged Network (PBBN) layer; and the provider network layer is composed of Provider Bridged Network (PBN) X and PBN Y, where the PBN X connects the CBN X and the PBBN, and the PBN Y connects the CBN Y and the PBBN.

The PBB TE technology sets up a tunnel on the PBBN network to forward the two-layer MAC data frames. The tunnel is identified by a Backbone Destination Address (B-DA) and a Backbone Virtual Local Area Network ID (B-VID) in a B-tag. In the PBB TE tunnel, only the B-tag needs to be identified, and the user information is transparent. The PBB TE technology provides connection-oriented services for data frames, and sets up a working tunnel and a standby tunnel through an outer tag (B-tag)+B-DA ("+" means "plus"). The number of the standby tunnels to be set up depends on the actual network configuration. Each B-VID identifies the working tunnel and the standby tunnel between a Backbone Source Address (B-SA) and a Backbone Destination Address (B-DA). FIG. 2 schematically shows PBB TE tunnel connections in the prior art. The data frames are forwarded between the B-SA and the B-DA1 through the working tunnel identified by B-VID1, and the data frames are forwarded between the B-SA and the B-DA2 through the working tunnel identified by B-VID1, and a standby tunnel is configured for the working tunnel and is identified by B-VID2. The standby tunnel provides end-to-end protection for the working tunnel between the B-SA and the B-DA2. The data frames are forwarded between the B-SA and the B-DA3 through the working channel identified by B-VID1. On a PBBN network, the working tunnel between the B-SA and the B-DA1 is identified by B-DA1+B-VID1; the working tunnel between the B-SA and the B-DA2 is identified by B-DA2+B-VID1, and the standby tunnel is identified by B-DA2+B-VID2; and the tunnel between the B-SA and the B-DA3 is identified by B-DA3+B-VID1. In the PBB TE tunnel, the B-VID is reusable for different B-DAs, but it is necessary to ensure the combination of B-DA and B-VID, that is, the B-DA+B-VID to be unique throughout the PBBN. The PBB TE technology provides a good foundation for network expansion.

Normally, the data traffic (namely, data frames) sent from the B-SA runs along the working tunnel to the B-DA. When the working tunnel fails, the preconfigured standby tunnel becomes active and takes over the data traffic sent from the B-SA. The data traffic is sent to the B-DA through the standby tunnel to implement protection switching. The protection switching provides carrier grade end-to-end protection between the B-SA and the B-DA. FIG. 3 schematically shows PBB TE end-to-end protection in a prior art. When the working tunnel identified by B-VID1 between the B-SA and the B-DA2 fails, the B-SA switches the data frames over to the preconfigured standby tunnel identified by B-VID2. On the PBBN, the standby tunnel is identified by B-DA2+B-VID2, and the data frames are sent to the B-DA2 through the standby tunnel, thus implementing protection switching and PBB TE end-to-end protection.

SUMMARY

To reasonably use network resources, the embodiments of the present disclosure provide a method, system, and device for forwarding data frames. The technical solution is as follows:

A method for forwarding data frames, includes:

by an upstream near-end device in a faulty part of a working tunnel, activating a segmental protection tunnel after receiving a data frame when a part of the working tunnel fails, where a start node of the segmental protection tunnel is the upstream near-end device and an end node of the segmental protection tunnel is a downstream near-end device in the faulty part;

forwarding the data frame to the downstream near-end device through the segmental protection tunnel; and forwarding the data frame from the downstream near-end device to a destination device through a faultless part of the working tunnel.

A system for forwarding data frames according to an embodiment of the present disclosure, includes:

an upstream near-end device, which is located at an upstream near end of a fault when a working tunnel fails, and is configured to activate a segmental protection tunnel and send a data frame to the segmental protection tunnel, where the upstream near-end device is a start node of the segmental protection tunnel; and a downstream near-end device, which is located at a downstream near end of the fault when the working tunnel fails, and is configured to receive the data frame forwarded from the segmental protection tunnel and forward the data frame to a destination device through a faultless part of the working tunnel, where the downstream near-end device is an end node of the segmental protection tunnel.

An upstream near-end device according to an embodiment of the present disclosure, includes:

a receiving module, configured to receive a data frame;

an activating module, configured to activate a segmental protection tunnel when a working tunnel fails; and a forwarding module, configured to forward the data frame received by the receiving module to the segmental protection tunnel activated by the activating module.

A downstream near-end device according to an embodiment of the present disclosure, includes:

a receiving module, configured to receive a data frame;

a modifying module, configured to modify the data frame received by the receiving module when a working tunnel fails; and a forwarding module, configured to forward the data frame modified by the modifying module to a destination device through a faultless part of the working tunnel.

The technical solutions under the embodiments of the present disclosure bring the following benefits:

Through the segmental protection tunnel provided for the working tunnel, when the working tunnel partly fails, the segmental protection tunnel replaces the faulty part of the working tunnel, and the data frame bypasses the faulty part of the working tunnel and is forwarded through the faultless part of the working tunnel. Therefore, the network resources are reasonably used, and thus the waste of network bandwidth is avoided, and multiple protection modes against faults are available to the operator.

DETAILED DESCRIPTION OF THE EMBODIMENTS

The existing PBB TE technology provides only end-to-end protection, and ignores the whole resource configuration of the working tunnel. Once the working tunnel fails, no matter whether the device or the link fails, and no matter whether a single fault occurs or multiple faults occur, the whole working tunnel is disabled, and the whole standby channel is activated. Consequently, the network resources are not reasonably used, and the network bandwidth is wasted.

To make the technical solution, objectives and merits of the present disclosure clearer, the following describes the embodiments of the present disclosure in more detail with reference to some accompanying drawings.

A method for forwarding data frames in an embodiment of the present disclosure, includes:

An upstream near-end device in a faulty part of a working tunnel activates a segmental protection tunnel after receiving a data frame when a part of the working tunnel fails, where the start node of the segmental protection tunnel is the upstream near-end device and the end node of the segmental protection tunnel is a downstream near-end device in the faulty part; the upstream near-end device forwards the data frame to the downstream near-end device through the segmental protection tunnel; and the data frame at the downstream near-end device is forwarded to the destination device through the faultless part of the working tunnel.

Embodiment 1

Figure 1:
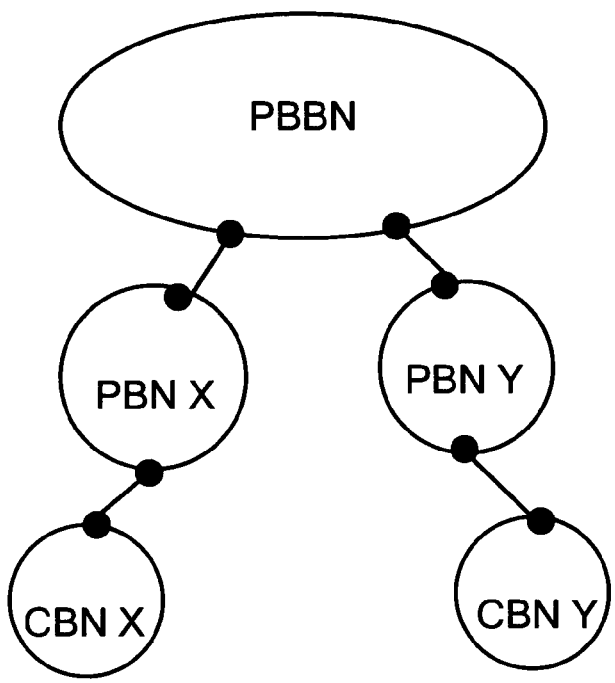
FIG. 1 shows a MAC-in-MAC network connection in a prior art.
Figure 2:
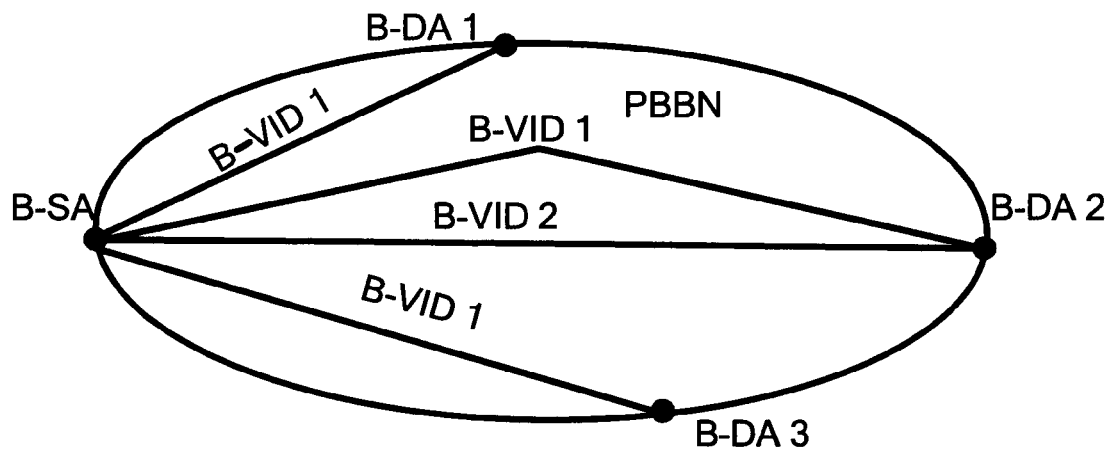
FIG. 2 shows a PBB TE tunnel connection in a prior art.
Figure 3:
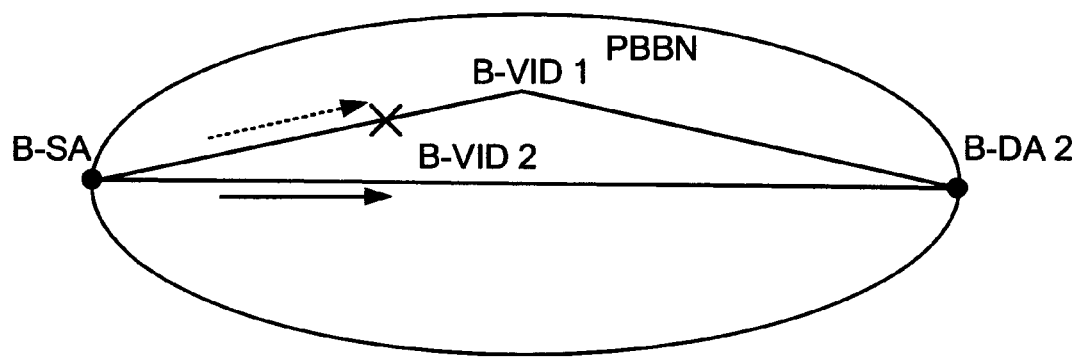
FIG. 3 shows PBB TE end-to-end protection in a prior art.
Figure 4:
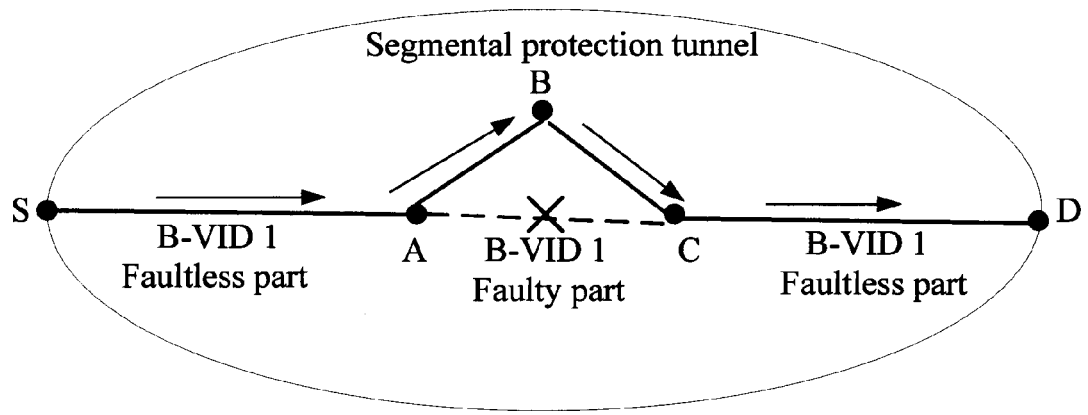
FIG. 4 shows a schematic diagram of a network for forwarding data frames according to a first embodiment of the present disclosure.
Figure 5:
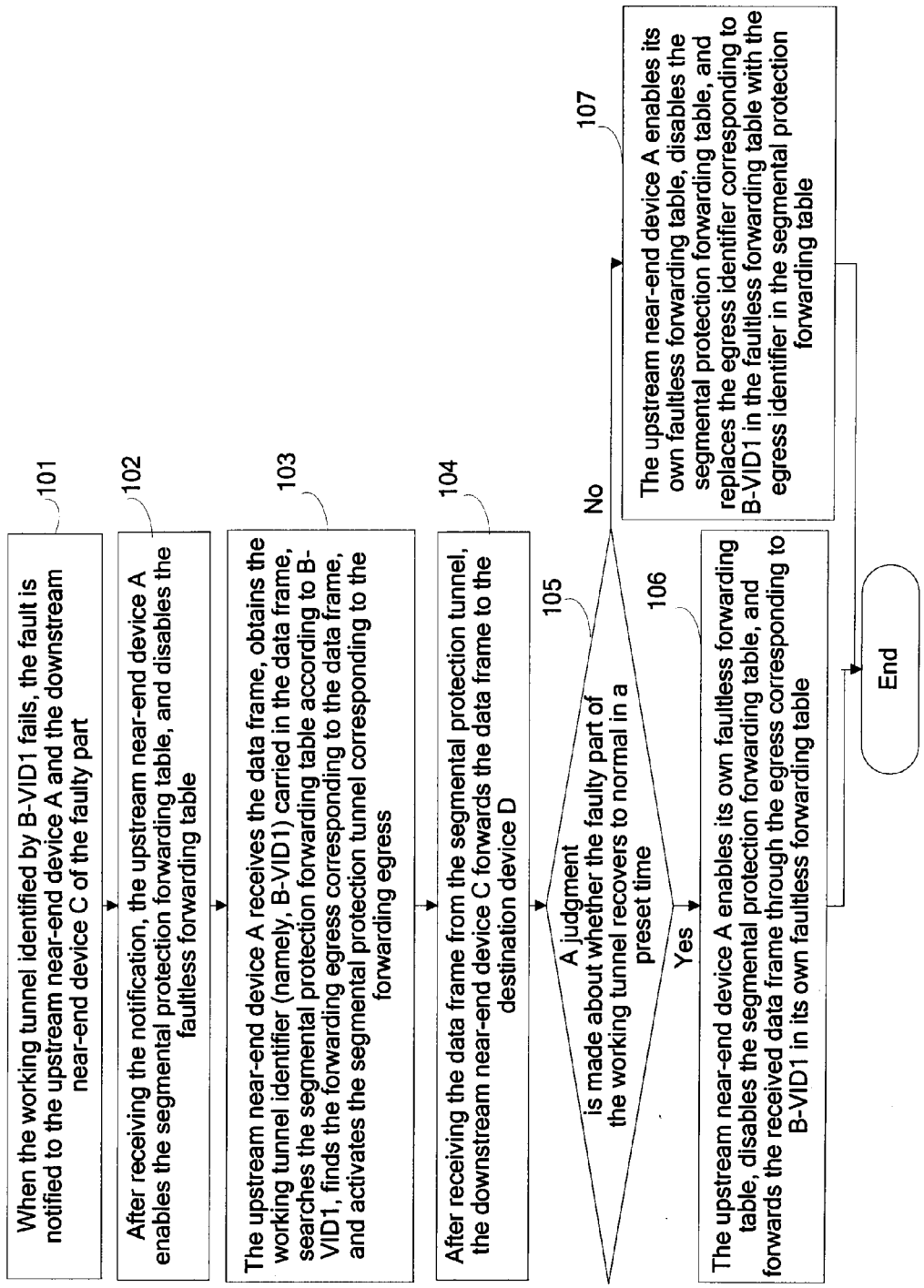
FIG. 5 is a flowchart of a data frame forwarding method according to the first embodiment of the present disclosure.

A method for forwarding data frames is provided in this embodiment. As shown in FIG. 4, a source device S sends a data frame to a destination device D, and the data frame carries B-VID1, B-VID1 indicates that the data frame needs to be forwarded through the working tunnel identified by B-VID1. It is assumed that a fault occurs between device A and device C (for example, the link fails, or the forwarding device between device A and device C fails). As shown in FIG. 5, in this embodiment, the upstream near-end device in the faulty part enables a segmental protection forwarding table, disables the faultless forwarding table, and forwards the data frame through the segmental protection tunnel corresponding to the faulty part. The method includes:

101: When the working tunnel identified by B-VID1 fails, the fault is notified to the upstream near-end device A and the downstream near-end device C of the faulty part.

When a fault occurs, the PBBN network uses Connectivity Fault Management (CFM)/Operation, Administration and Maintenance (OAM) to send a fault packet and notify the upstream near-end device A and the downstream near-end device C of the fault. In this embodiment, it is assumed that only a single fault occurs. Those skilled in the art know that the application of this embodiment is not limited to device faults or link faults, and the fault may occur at one point or more points.

102: After receiving the notification, the upstream near-end device A enables the segmental protection forwarding table, and disables the faultless forwarding table.

When the working tunnel is faultless, the forwarding table is a faultless forwarding table of the upstream near-end device A, as shown in Table 1. Table 2 is a segmental protection forwarding table in the upstream near-end device A. On the PBBN network, the PBB TE uses static configuration or signaling calculation to preset a segmental protection tunnel for the link or device vulnerable to faults in the tunnel according to the network planning requirements or the network resource collection status, and creates a segmental protection forwarding table for identifying the segmental protection tunnel in the upstream near-end device in the faulty part of the working tunnel.

The static configuration may be performed through a Network Management System (NMS), or the static configuration may be based on the path calculated by a Path Computation Element (PCE), or the static configuration may be implemented by other functions capable of static configuration of a tunnel in prior art. The signaling calculation may be performed through a Generalized Multi-Protocol Label Switching (GMPLS) protocol, or through a Fast Re-Routing (FRR) technology, or through other signaling technologies capable of setting up a standby tunnel in the prior art.

At the time of creating the segmental protection forwarding table, the fields set in the table are the same as the fields in the faultless forwarding table, and include a destination address, a B-VID, and an egress. The segmental protection forwarding table is enabled only when the upstream near-end device A receives a fault notification. The faultless forwarding table is disabled as soon as the segmental protection forwarding table is enabled. After the segmental protection forwarding table is enabled, the corresponding egress may be searched out in the segmental protection forwarding table according to the destination address and the B-VID carried in the data frame. The egress corresponds to the segmental protection tunnel preset by the upstream near-end device A. As shown in Table 2, egress 3 may be searched out according to the destination address "D" and B-VID1. When a notification indicating that the faulty party recovers to normal is received in the preset time, the segmental protection forwarding table is disabled, and the faultless forwarding table is enabled again: if no such notification is received in the preset time, the segmental protection forwarding table is disabled, and the faultless forwarding table is enabled again, and the egress corresponding to the destination address "D" and B-VID1 in the faultless forwarding table is replaced with the corresponding egress of the segmental protection forwarding table, that is, the "I" corresponding to the egress field in Table 1 is replaced with the "3" corresponding to this field in Table 2.

TABLE 1

| Destination Address | B-VID | Egress |
|---|---|---|
| D | B-VID1 | 1 |
| ... | ... | ... |

TABLE 2

| Destination Address | B-VID | Egress |
|---|---|---|
| D | B-VID1 | 3 |
| ... | ... | ... |

103: The upstream near-end device A receives the data frame sent by the source device S, obtains the working tunnel identifier (namely, B-VID1) carried in the data frame, searches the segmental protection forwarding table according to B-VID1, finds the forwarding egress corresponding to the data frame, and activates the segmental protection tunnel corresponding to the forwarding egress.

The egress identifier in the segmental protection forwarding table corresponds to the preset segmental protection tunnel. A forwarding device B may exist in the segmental protection tunnel. The forwarding device B uses static configuration or signaling calculation to create a forwarding entry in its own forwarding table to identify the segmental protection tunnel. The forwarding entry is configured to indicate the egress through which the data frame is forwarded to the downstream near-end device after the forwarding device B receives the data frame from the segmental protection tunnel.

104: After receiving the data frame from the segmental protection tunnel, the downstream near-end device C forwards the data frame to the destination device D.

Further, this embodiment provides a method for deciding whether to form a new working tunnel by judging whether the faulty part of the working tunnel recovers to normal in the preset time. The method includes:

105: A judgment is made about whether the faulty part of the working tunnel recovers to normal in the preset time. If the faulty part of the working tunnel recovers to normal in the preset time, the process proceeds to 106; otherwise, the process proceeds to 107.

The upstream near-end device A judges whether the faulty part of the working tunnel recovers to normal through the fault detection mechanism on the network. For example, the judgment is made by receiving the detection packet sent by the fault detection mechanism periodically. The detection packet carries the information about whether the faulty part of the working tunnel recovers to normal.

106: The upstream near-end device A enables its own faultless forwarding table, disables the segmental protection forwarding table, and forwards the received data frame through the egress corresponding to B-VID1 in its own faultless forwarding table. That is, the faulty part of the working tunnel is recovered from the fault and is used for forwarding the data frame. The process ends.

107: The upstream near-end device A enables its own faultless forwarding table, disables the segmental protection forwarding table, and replaces the egress identifier corresponding to B-VID1 in the faultless forwarding table with the egress identifier in the segmental protection forwarding table. That is, the segmental protection tunnel combines with the faultless part of the working tunnel corresponding to B-VID1 into a new working tunnel. The process ends.

In this embodiment, when the working tunnel fails, the upstream near-end device in the faulty part enables the segmental protection forwarding table, searches the segmental protection forwarding table according to the identifier of the working tunnel in the received data frame to obtain an egress, and replaces the faulty part in the old working tunnel with the segmental protection tunnel corresponding to the egress, thus connecting the segmental protection tunnel to the faultless part of the working tunnel. When the data frame is transmitted from the source device S to the destination device D through the working tunnel, the data frame bypasses the faulty part of the working tunnel, and is forwarded continuously through the faultless part of the old working tunnel. Therefore, in the process of sending the data frame, it is not necessary to disable the whole working tunnel when a part of the working tunnel fails; the tunnel is protected in segments; the network resources are reasonably used, and thus the waste of the network bandwidth is reduced.

Embodiment 2

Figure 6:
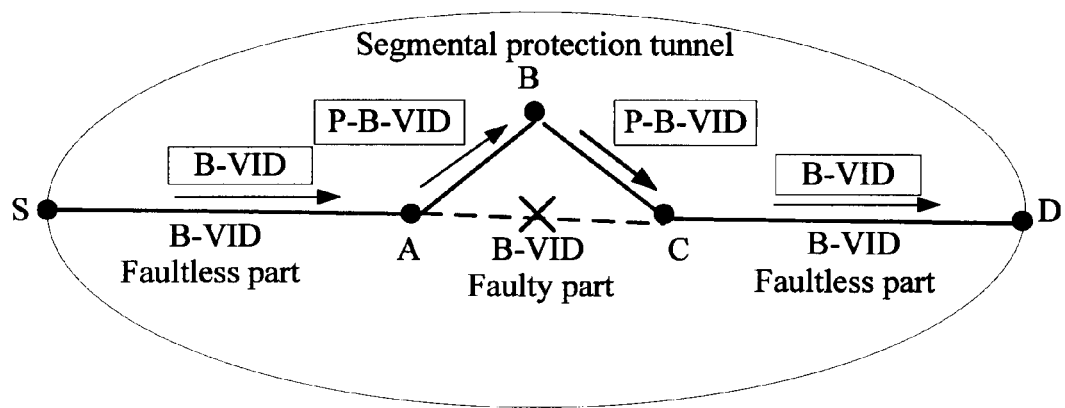
FIG. 6 shows a schematic diagram of a network for forwarding data frames according to a second embodiment of the present disclosure.
Figure 7:
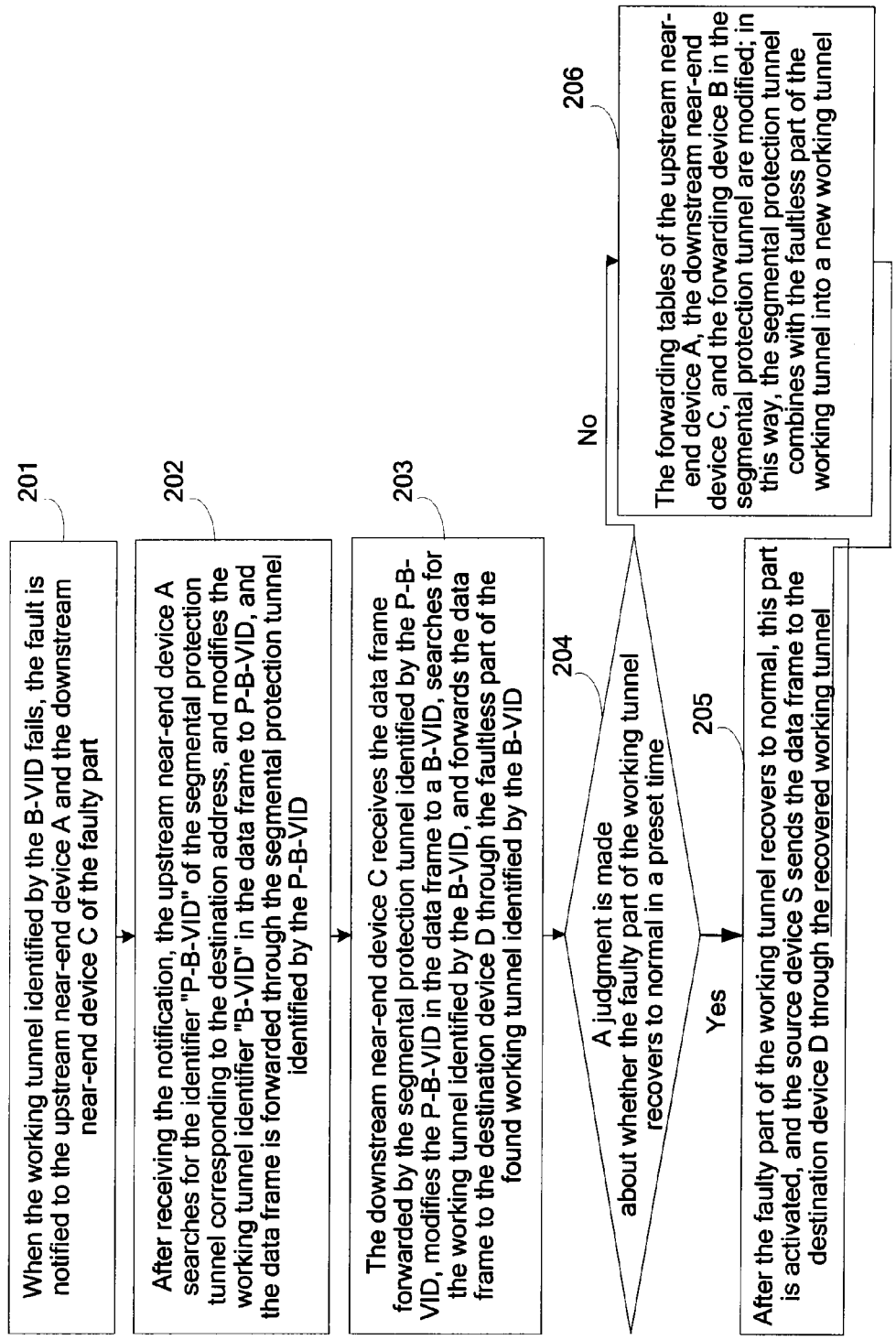
FIG. 7 is a flowchart of a data frame forwarding method according to the second embodiment of the present disclosure.

A method for forwarding data frames is provided in this embodiment. In the schematic diagram of the network structure shown in FIG. 6, a source device S sends a data frame to a destination device D. The data frame carries a B-VID, the B-VID indicates that the data frame needs to be forwarded through a working tunnel identified by the B-VID. It is assumed that a fault occurs between device A and device C. As shown in FIG. 7, in this embodiment, the upstream near-end device and the downstream near-end device in the faulty part modify the tunnel identifier in the data frame, and forward the data frame through the segmental protection tunnel corresponding to the faulty part. The method includes:

201: When the working tunnel identified by the B-VID fails, the fault is notified to the upstream near-end device A of the faulty part and the downstream near-end device C of the faulty part.

202: After receiving the notification, the upstream near-end device A of the faulty part searches for the identifier "P-B-VID" of the segmental protection tunnel corresponding to the destination address, and modifies the working tunnel identifier "B-VID" in the data frame to the found identifier "P-B-VID" of the segmental protection tunnel. The data frame is forwarded through the segmental protection tunnel identified by the P-B-VID.

A forwarding table is set in the upstream near-end device A. The fields of the forwarding table include: a destination address, a segmental protection tunnel identifier and an egress. The forwarding table may be searched according to the destination address carried in the data frame and the identifier "P-B-VID" of the segmental protection tunnel to find a corresponding egress, namely, the segmental protection tunnel corresponding to the P-B-VID.

A forwarding device B may exist in the segmental protection tunnel. The forwarding device B uses static configuration or signaling calculation to create a forwarding entry for identifying the segmental protection tunnel. The forwarding entry is configured to indicate the egress through which the data frame is forwarded to the downstream near-end device after the forwarding device B receives the data frame from the segmental protection tunnel.

203: The downstream near-end device C receives the data frame forwarded by the segmental protection tunnel identified by the P-B-VID, modifies the P-B-VID in the data frame to a B-VID, searches for the working tunnel identified by the B-VID, and forwards the data frame to the destination device D through the faultless part of the found working tunnel identified by the B-VID.

Further, this embodiment provides a method for determining whether to form a new working tunnel by judging whether the faulty part of the working tunnel recovers to normal in the preset time. The method includes:

204: A judgment is made about whether the faulty part of the working tunnel recovers to normal in the preset time. If the faulty part of the working tunnel recovers to normal in the preset time, the process proceeds to 205; otherwise, the process proceeds to 206.

205: After the faulty part of the working tunnel recovers to normal, this part is activated, and the source device S sends the data frame to the destination device D through the recovered working tunnel. The process ends.

206: The forwarding table of the upstream near-end device A, the forwarding table of the downstream near-end device C, and the forwarding table of the forwarding device B in the segmental protection tunnel are modified. In this way, the segmental protection tunnel combines with the faultless part of the working tunnel into a new working tunnel. The process ends.

The device on the segmental protection tunnel modifies the identifier "P-B-VID" of the segmental protection tunnel in the forwarding table to the identifier "B-VID" of the working tunnel. In this way, the faultless part of the working tunnel combines with the segmental protection tunnel into a new working tunnel. The new working tunnel may be identified by the B-VID of the old working tunnel or other B-VIDs. After the new working tunnel is formed, neither the upstream near-end device A nor the downstream near-end device C modifies the identifier carried in the received data frame.

In this embodiment, when the working tunnel fails, the upstream near-end device in the faulty part modifies the working tunnel identifier carried in the received data frame, searches for the segmental protection tunnel, and substitutes the found segmental protection tunnel for the faulty part in the old working tunnel. Therefore, in the process of sending the data frame, it is not necessary to disable the whole working tunnel when a part of the working tunnel fails; the tunnel is protected in segments; the network resources are reasonably used, and thus the waste of the network bandwidth is reduced.

Embodiment 3

Figure 8:
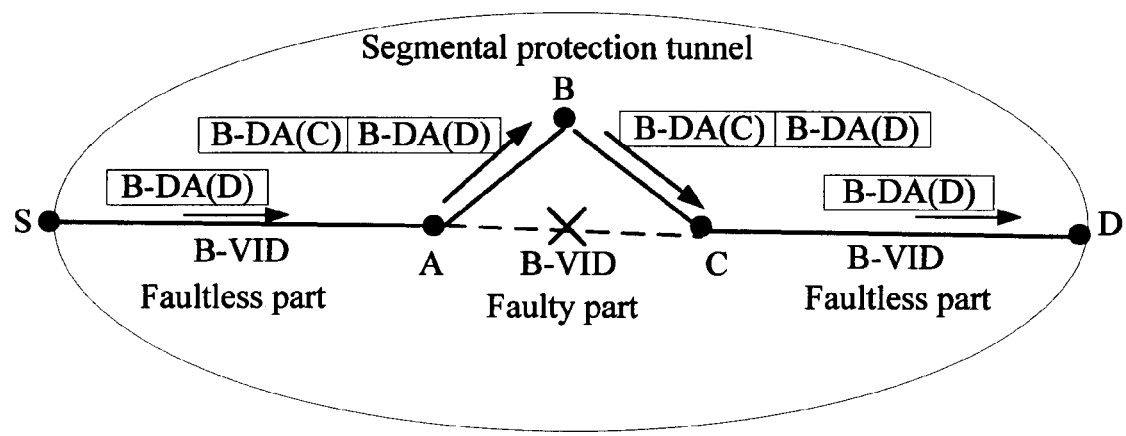
FIG. 8 shows a schematic diagram of a network for forwarding data frames according to a third embodiment of the present disclosure.
Figure 9:
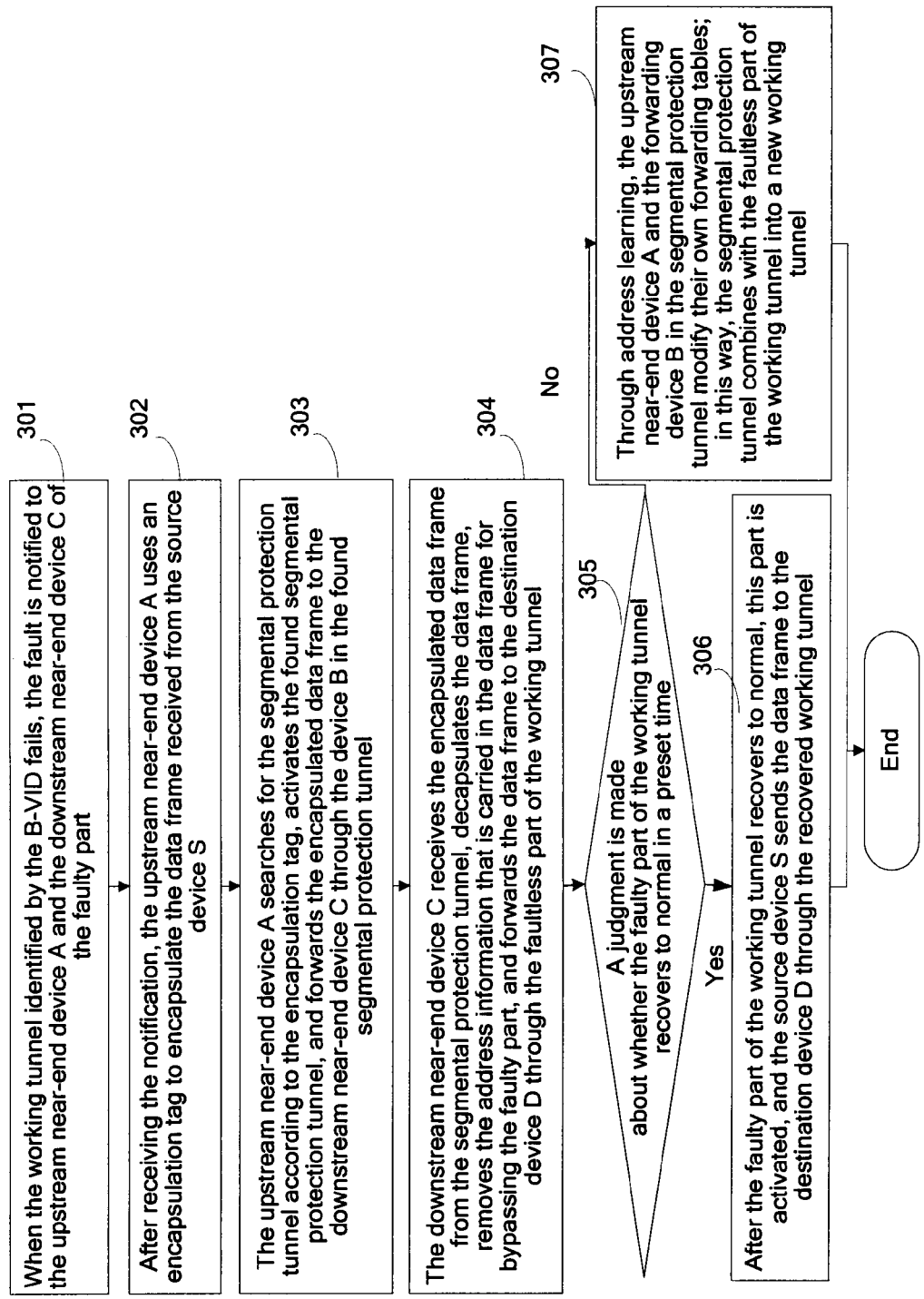
FIG. 9 is a flowchart of a data frame forwarding method according to the third embodiment of the present disclosure.

A method for forwarding data frames is provided in this embodiment. As shown in FIG. 8, a source device S sends a data frame to a destination device D, and the data frame carries a B-VID indicating that the data frame needs to be forwarded through the working tunnel identified by the B-VID. It is assumed that a fault occurs between device A and device C. As shown in FIG. 9, in this embodiment, the upstream near-end device and the downstream near-end device in the faulty part encapsulate and decapsulate the data frame, and forward the data frame through the segmental protection tunnel corresponding to the faulty part. The method includes:

301: When the working tunnel identified by the B-VID fails, the fault is notified to the upstream near-end device A and the downstream near-end device C of the faulty part.

302: After receiving the notification, the upstream near-end device A uses an encapsulation tag to encapsulate the data frame received from the source device S.

The data frame sent by the source device S is a MAC-in-MAC frame. The data frame carries the destination address B-DA(D). The encapsulated data frame carries the address information for bypassing the faulty part. The address information specifies the destination address B-DA(C) of the downstream near-end device C in the faulty part of the working tunnel.

303: The upstream near-end device A searches for the segmental protection tunnel according to the encapsulation tag, activates the found segmental protection tunnel, and forwards the encapsulated data frame to the downstream near-end device C through the device B in the found segmental protection tunnel.

304: The downstream near-end device C receives the encapsulated data frame from the segmental protection tunnel, decapsulates the encapsulated data frame, removes the address information that is carried in the encapsulated data frame for bypassing the faulty part, and forwards the data frame to the destination device D through the faultless part of the working tunnel.

The method for forwarding data frame provided in this embodiment encapsulates the received data frame, searches out the segmental protection tunnel through the encapsulated data frame, and substitutes the found segmental protection tunnel for the faulty part in the working tunnel. Therefore, the data frame bypasses the faulty part of the working tunnel in the process of transmission from the source device to the destination device, and the data frame may be forwarded continuously through the faultless part of the old working tunnel.

Further, this embodiment provides a method for determining whether to form a new working tunnel by judging whether the faulty part of the working tunnel recovers to normal in the preset time. The method includes:

305: A judgment is made about whether the faulty part of the working tunnel recovers to normal in the preset time. If the faulty part of the working tunnel recovers to normal in the preset time, the process proceeds to 306; otherwise, the process proceeds to 307.

306: After the faulty part of the working tunnel recovers to normal, this part is activated, and the source device S sends the data frame to the destination device D through the recovered working tunnel. The process ends.

307: Through address learning, the upstream near-end device A and the forwarding device B in the segmental protection tunnel modify their own forwarding tables. In this way, the segmental protection tunnel combines with the faultless part of the working tunnel into a new working tunnel. The process ends.

The devices on the segmental protection tunnel include the upstream near-end device A and the forwarding device B in the segmental protection tunnel. They modify their own forwarding tables through address learning. An entry for reaching the destination device D is added in the upstream near-end device A. The egress in this entry is consistent with the egress of the entry for reaching device C through a segmental protection tunnel. The old entry for reaching the destination device D in the upstream near-end device A is deleted, and the entry for reaching the destination device D is added into the forwarding device B. The egress in this entry is consistent with the egress of the entry for reaching device C through the segmental protection tunnel. In this way, the segmental protection tunnel combines with the faultless part of the working tunnel into a new working tunnel.

After the new working tunnel is formed, because the forwarding table of the device on the segmental protection tunnel is modified, the upstream near-end device A does not encapsulate the received data frame any longer. The faultless part of the working tunnel combines with the segmental protection tunnel into a new working tunnel. The new working tunnel may be identified by a B-VID of the old working tunnel or other B-VIDs.

In this embodiment, when the working tunnel fails, the upstream near-end device in the faulty part encapsulates the received frame with the destination address for bypassing the faulty part, searches for the segmental protection tunnel, and substitutes the found segmental protection tunnel for the faulty part in the old working tunnel. Therefore, in the process of sending the data frame, it is not necessary to disable the whole working tunnel when a part of the working tunnel fails; the tunnel is protected in segments; the network resources are reasonably used, and thus the waste of the network bandwidth is reduced.

Embodiment 4

Figure 10:
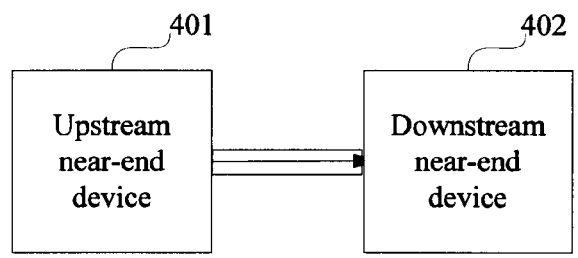
FIG. 10 is a schematic diagram of a system for forwarding data frames according to a fourth embodiment of the present disclosure.

FIG. 10 is a schematic diagram of a system for forwarding data frames in this embodiment. The system for forwarding data frames in this embodiment, includes:

an upstream near-end device (401), which is located at an upstream near end of a fault when a working tunnel fails, and is configured to activate a segmental protection tunnel and send the data frame to the segmental protection tunnel, where the upstream near-end device (401) is a start node of the segmental protection tunnel; and a downstream near-end device (402), which is located at a downstream near end of the fault when the working tunnel fails, and is configured to receive the data frame forwarded by the segmental protection tunnel and forward the data frame to a destination device through a faultless part of the working tunnel, where the downstream near-end device (402) is an end node of the segmental protection tunnel.

When the working tunnel fails, the PBBN network uses the CFM/OAM to send a fault packet to the upstream near-end device (401) and the downstream near-end device (402) in the faulty part.

Figure 11:
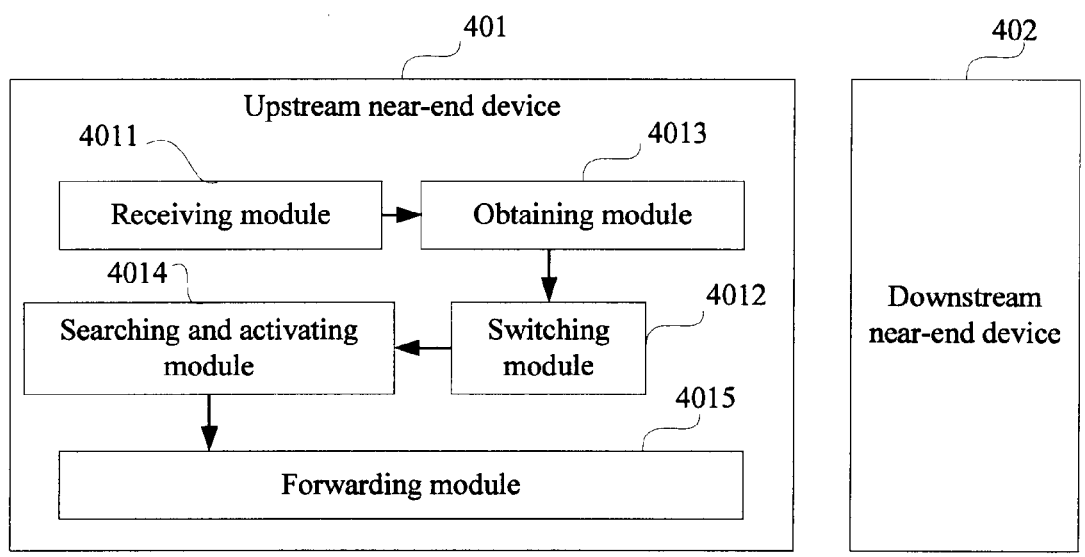
FIG. 11 is the first detailed schematic diagram of a system for forwarding data frames according to the fourth embodiment of the present disclosure.

When the working tunnel fails, corresponding to the method embodiment, the system in this embodiment implements the segmental protection for the working tunnel according to one of the following modes:

(1) The system enables the segmental protection forwarding table and obtains the segmental protection tunnel, which then replaces the faulty part of the working tunnel. In this case, as shown in FIG. 11, the upstream near-end device 401 in the system includes:

a receiving module (4011), configured to receive a data frame;

a switching module (4012), configured to enable its own segmental protection forwarding table and disable the faultless forwarding table when a part of the working tunnel fails;

an obtaining module (4013), configured to obtain a working tunnel identifier in the data frame received by the receiving module (4011);

a searching and activating module (4014), configured to: search the segmental protection forwarding table enabled by the switching module (4012) for the egress identifier corresponding to the working tunnel identifier according to the working tunnel identifier obtained by the obtaining module (4013), and activate the segmental protection tunnel corresponding to the egress identifier; and a forwarding module (4015), configured to forward the data frame through the segmental protection tunnel activated by the searching and activating module (4014).

Figure 12:
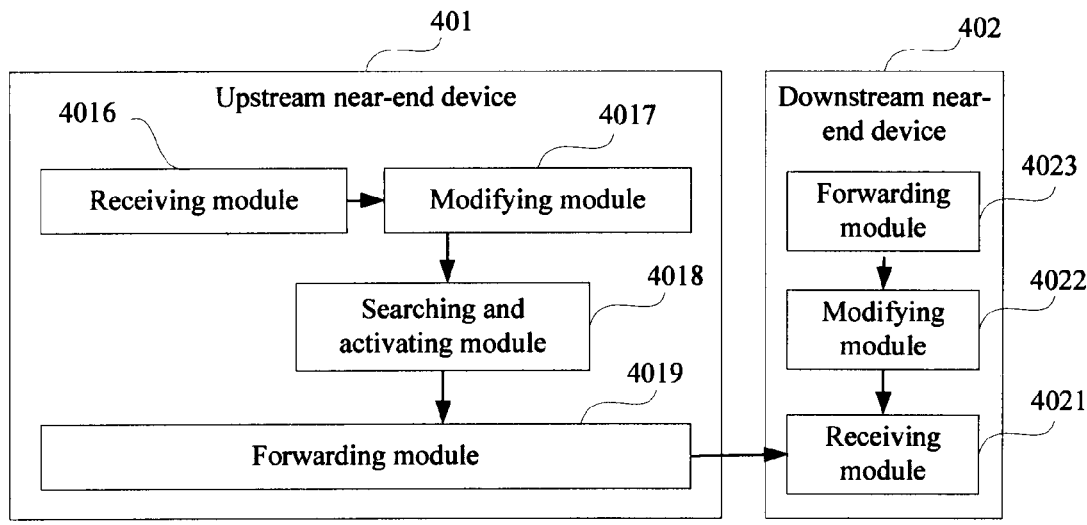
FIG. 12 is the second detailed schematic diagram of a system for forwarding data frames according to the fourth embodiment of the present disclosure.

(2) The system searches the forwarding table through the destination address carried in the data frame, finds the identifier of the corresponding segmental protection tunnel and the corresponding egress, namely, finds the segmental protection tunnel corresponding to the identifier of the segmental protection tunnel, and modifies the working tunnel identifier in the data frame to the identifier of the segmental protection tunnel. In this way, the segmental protection tunnel replaces the faulty part of the working tunnel. In this case, as shown in FIG. 12, the upstream near-end device (401) in the system may include:

a receiving module (4016), configured to receive a data frame;

a modifying module (4017), configured to: obtain the identifier of the segmental protection tunnel corresponding to the destination address carried in the data frame received by the receiving module (4016) when a part of the working tunnel fails, and modify the working tunnel identifier in the data frame to the identifier of the segmental protection tunnel;

a searching and activating module (4018), configured to: search a forwarding table for the corresponding segmental protection tunnel according to the destination address in the data frame modified by the modifying module (4017) and the identifier of the segmental protection tunnel, and activate the segmental protection tunnel; and a forwarding module (4019), configured to forward the data frame modified by the modifying module (4017) through the segmental protection tunnel activated by the searching and activating module (4018).

Accordingly, the downstream near-end device (402) includes:

a receiving module (4021), configured to receive a data frame;

a modifying module (4022), configured to modify the identifier of the segmental protection tunnel in the data frame received by the receiving module (4021) to the working tunnel identifier; and a forwarding module (4023), configured to forward the data frame modified by the modifying module (4022) to a destination device through a faultless part of the working tunnel.

Figure 13:
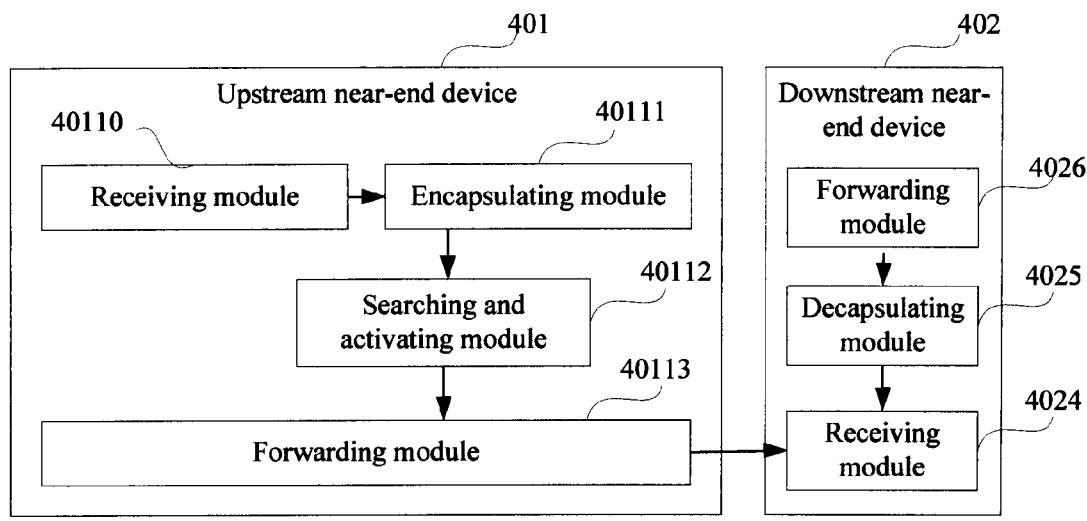
FIG. 13 is the third detailed schematic diagram of a system for forwarding data frames according to the fourth embodiment of the present disclosure.

(3) The system encapsulates the data frame by using the address information for bypassing the faulty part, and obtains the segmental protection tunnel, which then replaces the faulty part of the working tunnel. In this case, as shown in FIG. 13, the upstream near-end device (401) in the system may include:

a receiving module (40110), configured to receive a data frame;

an encapsulating module (40111), configured to encapsulate the data frame received by the receiving module (40110) when a part of the working tunnel fails, where the encapsulated data frame carries the address information for bypassing the faulty part of the working tunnel;

a searching and activating module (40112), configured to: search for the segmental protection tunnel according to the address information for bypassing the faulty part in the data frame encapsulated by the encapsulating module (40111), and activate the found segmental protection tunnel; and a forwarding module (40113), configured to forward the data frame encapsulated by the encapsulating module (40111) through the segmental protection tunnel activated by the searching and activating module (40112).

Accordingly, the downstream near-end device (402) includes:

a receiving module (4024), configured to receive a data frame;

a decapsulating module (4025), configured to: decapsulate the data frame received by the receiving module (4024), and remove the address information for bypassing the faulty part in the data frame; and a forwarding module (4026), configured to forward the data frame decapsulated by the decapsulating module (4025) to the destination device through the faultless part of the working tunnel.

Figure 14:
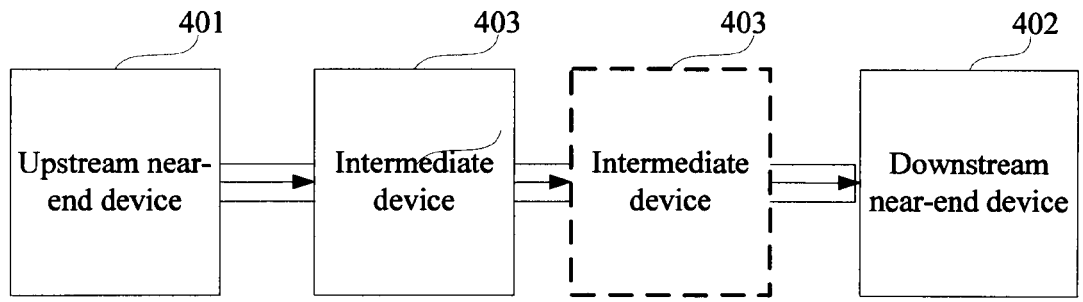
FIG. 14 is another schematic diagram of a system for forwarding data frames according to the fourth embodiment of the present disclosure.

Further, as shown in FIG. 14, a system for forwarding data frames in this embodiment includes:

an intermediate device (403), which is located in the segmental protection tunnel when the working tunnel fails and is configured to receive the data frame sent by the upstream near-end device (401) and forward the data frame to the downstream near-end device (402), where there may be more than one intermediate devices (403), and, accordingly, the segmental protection tunnel is composed of multiple intermediate devices (403) and communication links between the intermediate devices (403).

In this embodiment, when the working tunnel fails, the segmental protection tunnel replaces the faulty part in the old working tunnel. Therefore, in the process of sending the data frame, it is not necessary to disable the whole working tunnel when a part of the working tunnel fails; the tunnel is protected in segments, the network resources are reasonably used, thus the waste of the network bandwidth is reduced, and multiple protection modes against faults are available to the operator.

Embodiment 5

Figure 15:
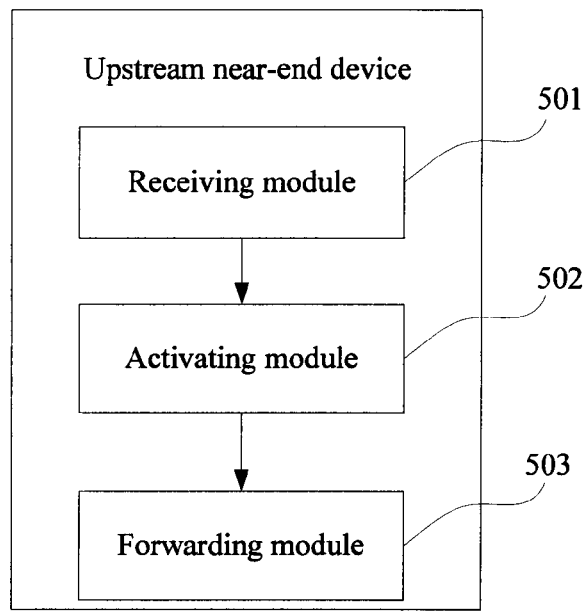
FIG. 15 shows a schematic diagram of an upstream near-end device according to a fifth embodiment of the present disclosure.

As shown in FIG. 15, an upstream near-end device provided in this embodiment includes:

a receiving module (501), configured to receive a data frame;

an activating module (502), configured to activate a segmental protection tunnel when a working tunnel fails; and a forwarding module (503), configured to forward the data frame received by the receiving module (501) to the segmental protection tunnel activated by the activating module (502).

Figure 16:
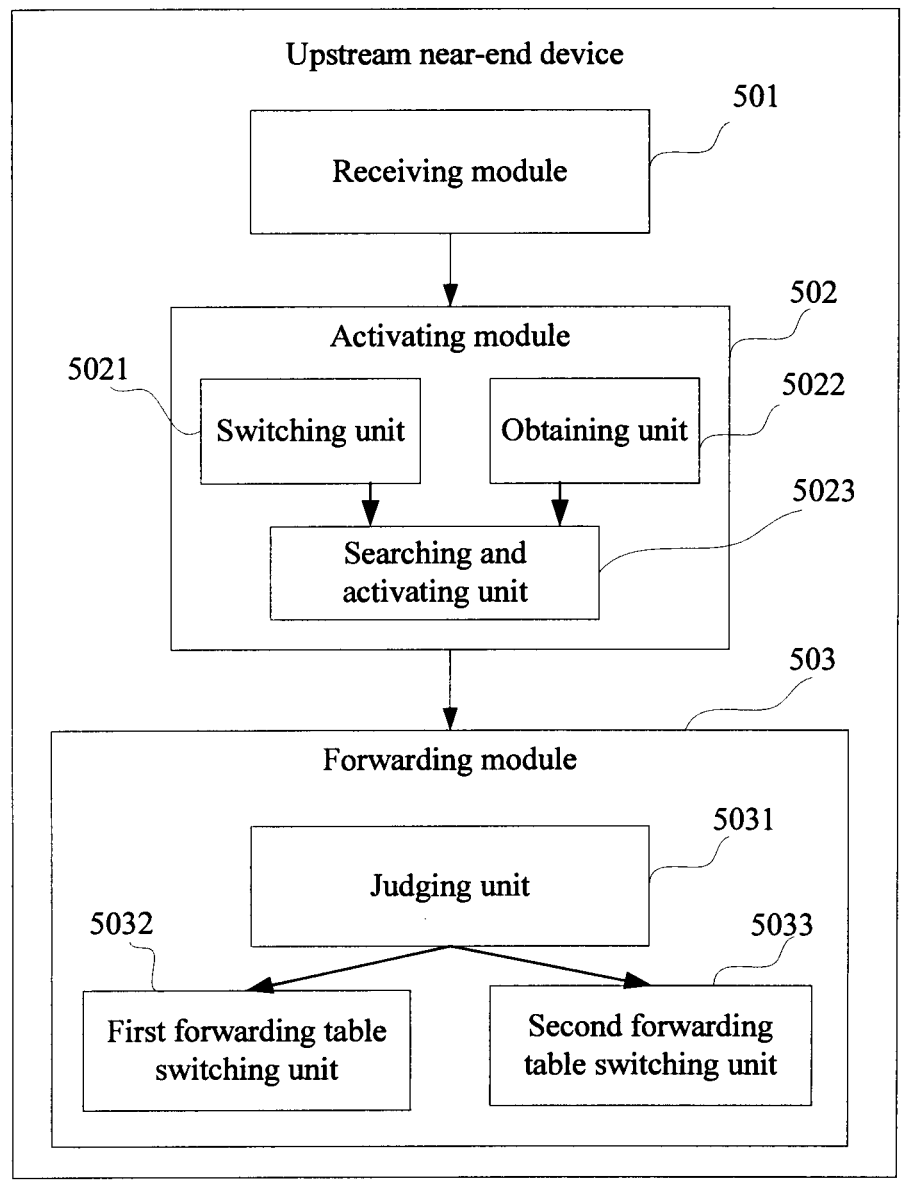
FIG. 16 is the first detailed schematic diagram of an upstream near-end device according to the fifth embodiment of the present disclosure.

When the working tunnel fails, corresponding to the method embodiment, the system in this embodiment implements the segmental protection for the working tunnel through at least one of the following modes:

(1) The system enables the segmental protection forwarding table and obtains the segmental protection tunnel, which then replaces the faulty part of the working tunnel. In this case, as shown in FIG. 16, the activating module (502) in the upstream near-end device includes:

a switching unit (5021), configured to enable its own segmental protection forwarding table and disable the faultless forwarding table when a part of the working tunnel fails;

an obtaining unit (5022), configured to obtain a working tunnel identifier in the data frame received by the receiving module (501); and a searching and activating unit (5023), configured to: search the segmental protection forwarding table enabled by the switching unit (5021) for the egress identifier corresponding to the working tunnel identifier according to the working tunnel identifier obtained by the obtaining unit (5022), and activate the segmental protection tunnel corresponding to the egress identifier.

Further, the forwarding module (503) of the upstream near-end device provided in this embodiment includes:

a judging unit (5031), configured to judge whether the faulty part recovers to normal in the preset time;

a first forwarding table switching unit (5032), configured to enable its own faultless forwarding table and disable the segmental protection forwarding table when the judging unit (5031) determines that the faulty part recovers to normal; and a second forwarding table switching unit (5033), configured to: enable the faultless forwarding table and disable the segmental protection forwarding table when the judging unit (5031) determines that the faulty part does not recover to normal, and replace the egress identifier corresponding to the working tunnel identifier in the enabled faultless forwarding table with the corresponding egress identifier in the segmental protection forwarding table.

In this mode, when the working tunnel fails, the upstream near-end device enables the segmental protection forwarding table, searches the segmental protection forwarding table according to the working tunnel identifier in the received data frame to obtain an egress, and replaces the faulty part in the old working tunnel with the segmental protection tunnel corresponding to the egress, thus connecting the segmental protection tunnel to the faultless part of the working tunnel. Therefore, in the transmission process of the data frame, it is not necessary to disable the whole working tunnel when a part of the working tunnel fails; the tunnel is protected in segments; the network resources are reasonably used; and thus the waste of the network bandwidth is reduced.

Figure 17:
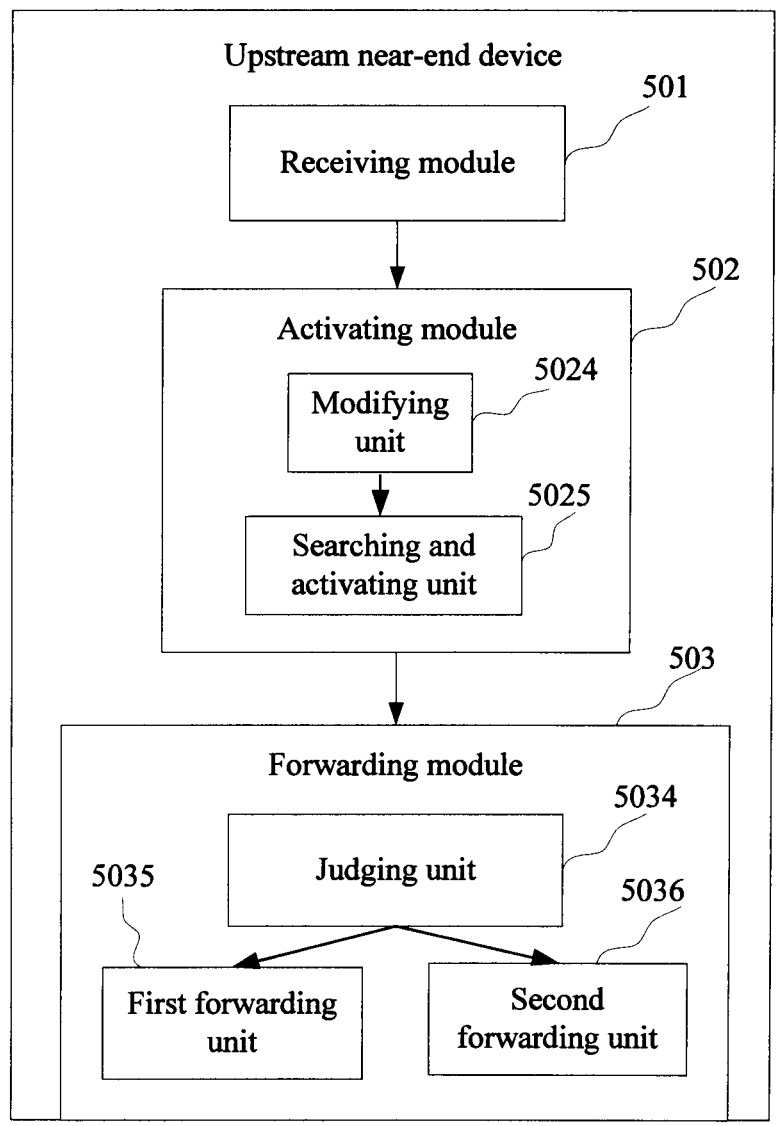
FIG. 17 is the second detailed schematic diagram of an upstream near-end device according to the fifth embodiment of the present disclosure.

(2) The system searches the forwarding table through the destination address carried in the data frame, finds the identifier of the corresponding segmental protection tunnel and the corresponding egress, namely, finds the segmental protection tunnel corresponding to the identifier of the segmental protection tunnel, and modifies the working tunnel identifier in the data frame to the identifier of the segmental protection tunnel. In this way, the segmental protection tunnel replaces the faulty part of the working tunnel. In this case, as shown in FIG. 17, the activating module (502) in the upstream near-end device includes:

a modifying unit (5024), configured to: obtain the identifier of the segmental protection tunnel corresponding to the destination address carried in the data frame received by the receiving module (501) when a part of the working tunnel fails, and modify the working tunnel identifier in the data frame to the identifier of the segmental protection tunnel; and a searching and activating unit (5025), configured to: search a forwarding table for the corresponding segmental protection tunnel according to the destination address in the data frame modified by the modifying unit (5024) and the identifier of the segmental protection tunnel, and activate the segmental protection tunnel.

Further, the forwarding module (503) of the upstream near-end device provided in this embodiment includes:

a judging unit (5034), configured to judge whether the faulty part recovers to normal in the preset time;

a first forwarding unit (5035), configured to forward the data frame received by the receiving module (501) through the faulty part recovered to normal when the judging unit (5034) determines that the faulty part recovers to normal;

a second forwarding unit (5036), configured to: modify the identifier of the segmental protection tunnel in the forwarding table to the working tunnel identifier when the judging unit (5034) determines that the faulty part does not recover to normal, and forward the data frame received by the receiving module (501) to the destination device.

In this mode, when the working tunnel fails, the upstream near-end device modifies the working tunnel identifier in the received data frame, searches for the segmental protection tunnel, and substitutes the found segmental protection tunnel for the faulty part in the old working tunnel. Therefore, in the process of sending the data frame, it is not necessary to disable the whole working tunnel when a part of the working tunnel fails; the tunnel is protected in segments; the network resources are reasonably used, and thus the waste of the network bandwidth is reduced.

Figure 18:
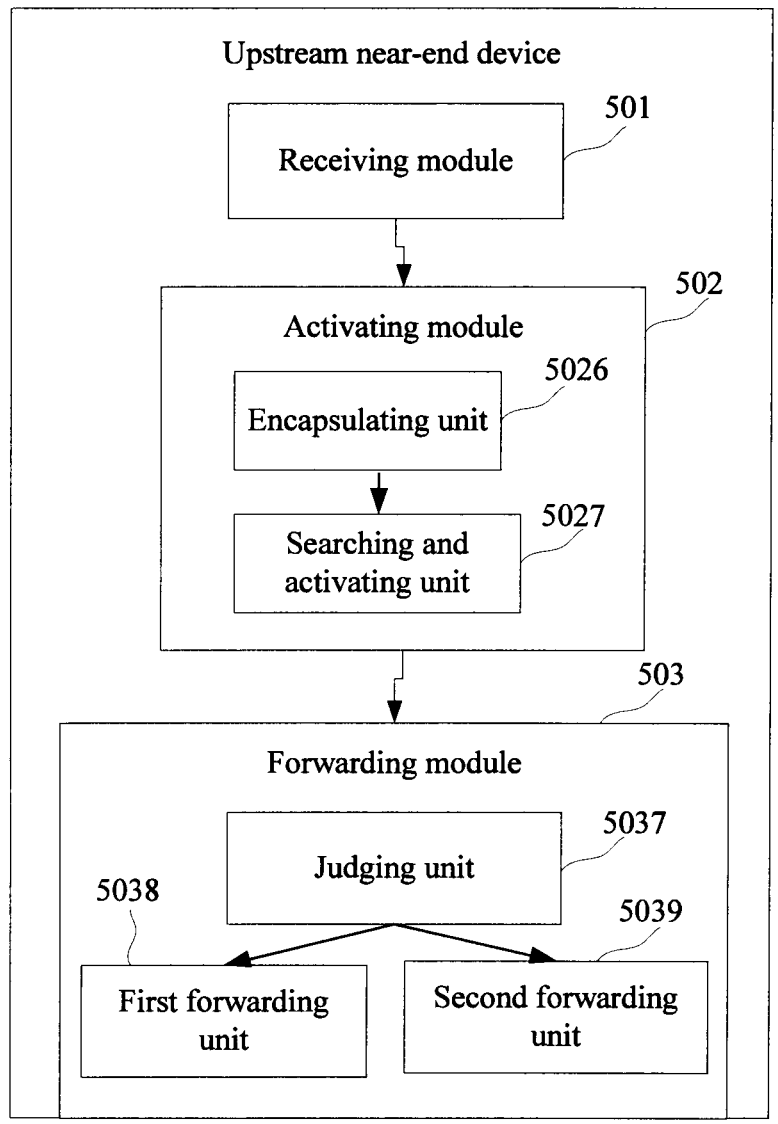
FIG. 18 is the third detailed schematic diagram of an upstream near-end device according to the fifth embodiment of the present disclosure.

(3) The system encapsulates the data frame by using the address information for bypassing the faulty part, and obtains the segmental protection tunnel, which then replaces the faulty part of the working tunnel. In this case, as shown in FIG. 18, the activating module (502) in the upstream near-end device includes:

an encapsulating unit (5026), configured to encapsulate the data frame received by the receiving module (501) when a part of the working tunnel fails, where the encapsulated data frame carries the address information for bypassing the faulty part; and a searching and activating unit (5027), configured to: search for the segmental protection tunnel according to the address information for bypassing the faulty part in the data frame encapsulated by the encapsulating unit (5026), and activate the found segmental protection tunnel.

Further, the forwarding module (503) of the upstream near-end device provided in this embodiment includes:

a judging unit (5037), configured to judge whether the faulty part recovers to normal in the preset time;

a first forwarding unit (5038), configured to forward the data frame received by the receiving module (501) through the faulty part recovered to normal when the judging unit (5037) determines that the faulty part recovers to normal; and a second forwarding unit (5039), configured to: add an entry for reaching the destination device to its own forwarding table when the judging unit (5037) determines that the faulty part does not recover to normal, where the egress of the entry is connected to the segmental protection tunnel; delete the old entry for reaching the destination device in the forwarding table; and forward the data frame received by the receiving module (501) to the destination device.

In this mode, when the working tunnel fails, the upstream near-end device encapsulates the received data frame with the destination address for bypassing the faulty part, searches for the segmental protection tunnel, and substitutes the found segmental protection tunnel for the faulty part in the old working tunnel. Therefore, in the process of sending the data frame, it is not necessary to disable the whole working tunnel when a part of the working tunnel fails; the tunnel is protected in segments; the network resources are reasonably used, and the waste of the network bandwidth is reduced.

Embodiment 6

Figure 19:
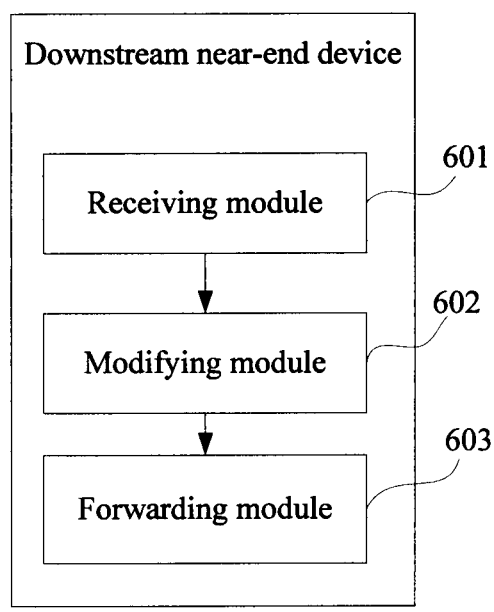
FIG. 19 shows a downstream near-end device according to a sixth embodiment of the present disclosure.

As shown in FIG. 19, a downstream near-end device provided in this embodiment includes:

a receiving module (601), configured to receive a data frame;

a modifying module (602), configured to modify the data frame received by the receiving module (601) when a working tunnel fails; and a forwarding module (603), configured to forward the data frame modified by the modifying module (602) to a destination device through a faultless part of the working tunnel.

(1) When the data frame received by the receiving module carries an identifier of the segmental protection tunnel, the modifying module is an identifier modifying unit (6021), which is configured to modify the segmental protection tunnel identifier in the data frame received by the receiving module (601) to the working tunnel identifier when the working tunnel fails.

Further, the downstream near-end device includes an updating module (604), which is configured to: modify the working tunnel identifier in the forwarding table to the identifier of the segmental protection tunnel when the faulty part does not recover to normal in the preset time, and forward the data frame to the destination device.

In this mode, when the working tunnel fails, the downstream near-end device modifies the segmental protection tunnel identifier in the received data frame to the identifier of the working tunnel, and forwards the data frame to the destination device through the faultless part of the working tunnel. Therefore, in the process of sending the data frame, it is not necessary to disable the whole working tunnel when a part of the working tunnel fails; the tunnel is protected in segments; the network resources are reasonably used, and the waste of the network bandwidth is reduced.

(2) When the data frame received by the receiving module carries the address information for bypassing the faulty part, the modifying unit (602) is a decapsulating unit (6022), which is configured to decapsulate the data frame received by the receiving module (601), and remove the address information for bypassing the faulty part in the data frame.

In this mode, when the working tunnel fails, the downstream near-end device decapsulates the received data frame, removes the address information for bypassing the faulty part of the working tunnel in the data frame, and forwards the data frame to the destination device through the faultless part of the working tunnel. Therefore, in the process of sending the data frame, it is not necessary to disable the whole working tunnel when a part of the working tunnel fails; the tunnel is protected in segments; the network resources are reasonably used, and the waste of the network bandwidth is reduced.

In the foregoing embodiment, when a part of the working tunnel fails, segmental protection is provided for the PBB TE tunnel, and a segmental protection tunnel replaces the faulty part of the working tunnel; the data frame bypasses the faulty part of the working tunnel and is forwarded through the faultless part of the working tunnel. Therefore, the network resources are reasonably used, the waste of the network bandwidth is reduced, and multiple protection modes against faults are available to the operator.

Some of the steps involved in the embodiments of the present disclosure may be implemented by software. The software program may be stored in a readable storage medium such as a hard disk or a Compact Disk (CD).

Although the disclosure has been described through several exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for forwarding a data frame in an Open System Interconnection (OSI) layer 2 Provider Bridged Network, comprising:
   receiving, by an upstream near-end device in a faulty part of a working tunnel of the OSI layer 2 Provider Bridged Network, the data frame, wherein the upstream near-end device is a start node of a segmental protection tunnel, a downstream near-end device in the faulty part is an end node of the segmental protection tunnel, the upstream near-end device and the downstream near-end device are on the same working tunnel and the segmental protection tunnel is used for protecting a segment of the working tunnel;
   searching for an identifier of the segmental protection tunnel according to a destination address of the data frame;
   modifying a working tunnel identifier carried in the data frame to the identifier of the segmental protection tunnel; and
   forwarding the modified data frame to the downstream near-end device through the segmental protection tunnel.

2. The method according to claim 1, wherein after the data frame is forwarded from the downstream near-end device to a destination device through a faultless part of the working tunnel, the method further comprises:
   using the faulty part as a part of the working tunnel if the faulty part recovers to normal in a preset time; and
   combining the segmental protection tunnel with the faultless part of the working tunnel into a new working tunnel if the faulty part does not recover to normal in the preset time.

3. The method according to claim 1, wherein after the data frame is forwarded from the downstream near-end device to a destination device through a faultless part of the working tunnel, the method further comprises:
   using the faulty part as a part of the working tunnel if the faulty part recovers to normal in a preset time, the using the faulty part as the part of the working tunnel comprises: forwarding, by the upstream near-end device, a received data frame through the faulty part recovered to normal; and
   combining the segmental protection tunnel with the faultless part of the working tunnel into a new working tunnel if the faulty part does not recover to normal in the preset time; the combining the segmental protection tunnel with the faultless part of the working tunnel into the new working tunnel comprises: modifying, by the upstream near-end device, the segmental protection tunnel identifier in its own forwarding table to the identifier of the working tunnel; by the downstream near-end device, modifying the identifier of the segmental protection tunnel identifier in its own forwarding table to the working tunnel identifier, and forwarding a modified data frame to the destination device.

4. The method according to claim 1, wherein:
   the segmental protection tunnel is implemented by means of static configuration performed by a Network Management System (NMS).

5. The method according to claim 1, wherein:
   the segmental protection tunnel is implemented by means of static configuration performed through a path calculated out by a Path Computation Element (PCE).

6. The method according to claim 1, wherein:
   the segmental protection tunnel is implemented by means of signaling calculation performed through a Generalized Multi-Protocol Label Switching (GMPLS) protocol.

7. A system for forwarding a data frame in an Open System Interconnection (OSI) layer 2 Provider Bridged Network, comprising:
   an upstream near-end device of the OSI layer 2 Provider Bridged Network, which is located at an upstream near end of a fault when a working tunnel fails, and is configured to activate a segmental protection tunnel and send the data frame to the segmental protection tunnel, wherein the upstream near-end device is a start node of the segmental protection tunnel, the segmental protection tunnel is used for protecting a segment of the working tunnel and the upstream near-end device comprises:
   a receiving module, configured to receive the data frame;

a modifying module, configured to: obtain an identifier of the segmental protection tunnel corresponding to a destination address of the data frame received by the receiving module when a part of the working tunnel fails, and modify a working tunnel identifier in the data frame to the identifier of the segmental protection tunnel; and a downstream near-end device of the OSI layer 2 Provider Bridged Network, which is located at a downstream near end of the fault when the working tunnel fails, and is configured to receive the modified data frame forwarded through the segmental protection tunnel and forward the data frame to a destination device through a faultless part of the working tunnel, wherein the downstream near-end device is an end node of the segmental protection tunnel and the upstream near-end device and the downstream near-end device are on the same working tunnel.

8. The system according to claim 7, wherein:

the downstream near-end device comprises:

a receiving module, configured to receive the data frame;

a modifying module, configured to modify the identifier of the segmental protection tunnel in the data frame received by the receiving module of the downstream near-end device to the working tunnel identifier; and a forwarding module, configured to forward the data frame modified by the modifying module of the downstream near-end device to the destination device through the faultless part of the working tunnel.

9. An upstream near-end device configured to be used in an Open System Interconnection (OSI) layer 2 Provider Bridged Network, comprising:

a receiving module, configured to receive a data frame;

an activating module, configured to activate a segmental protection tunnel when a working tunnel fails, wherein the segmental protection tunnel is used for protecting a segment of the working tunnel and the activating module comprises a modifying unit, which is configured to obtain an identifier of the segmental protection tunnel corresponding to a destination address of the data frame received by the receiving module when a part of the working tunnel fails, and modify a working tunnel identifier in the data frame to the identifier of the segmental protection tunnel; and a forwarding module, configured to forward the modified data frame to a downstream near-end device through the segmental protection tunnel activated by the activating module, wherein the upstream near-end device and the downstream near-end device are on the same working tunnel.

10. The upstream near-end device according to claim 9, wherein the forwarding module of the device further comprises:

a judging unit, configured to judge whether the faulty part recovers to normal in a preset time;

a first forwarding unit, configured to forward a data frame received by the receiving module through the faulty part recovered to normal when the judging unit determines that the faulty part recovers to normal; and a second forwarding unit, configured to: modify the identifier of the segmental protection tunnel in the forwarding table to the working tunnel identifier when the judging unit determines that the faulty part does not recover to normal, and forward a modified data frame to a destination device.

\* \* \* \* \*